No. 666,212. Patented Jan. 15, 1901.
A. B. SIMMONS.
MOLE TRAP.
(Application filed Sept. 1, 1900.)
(No Model.)

Witnesses:
Franck L. Ouraud
F. G. Radelfinger

Inventor:
Amos B. Simmons,
By Louis Bagger & Co.,
Attorneys.

UNITED STATES PATENT OFFICE.

AMOS BENTON SIMMONS, OF CALISTOGA, CALIFORNIA.

MOLE-TRAP.

SPECIFICATION forming part of Letters Patent No. 666,212, dated January 15, 1901.

Application filed September 1, 1900. Serial No. 28,784. (No model.)

*To all whom it may concern:*

Be it known that I, AMOS BENTON SIMMONS, a citizen of the United States, residing at Calistoga, in the county of Napa and State of California, have invented new and useful Improvements in Mole-Traps, of which the following is a specification.

My invention relates to mole-traps; and the object of the same is to construct a trap of this class which will be simple and cheap in construction and efficient in operation.

My improved trap is designed to be set astride of mole-runs to be sprung by the mole attempting to force its way past it and to impale and kill it. This is accomplished by a simple and novel construction to be herein fully described and claimed.

I am aware that others have invented traps which contain the broad idea employed in mine. Therefore I do not claim impaling mole-traps broadly.

Figures 1, 2:
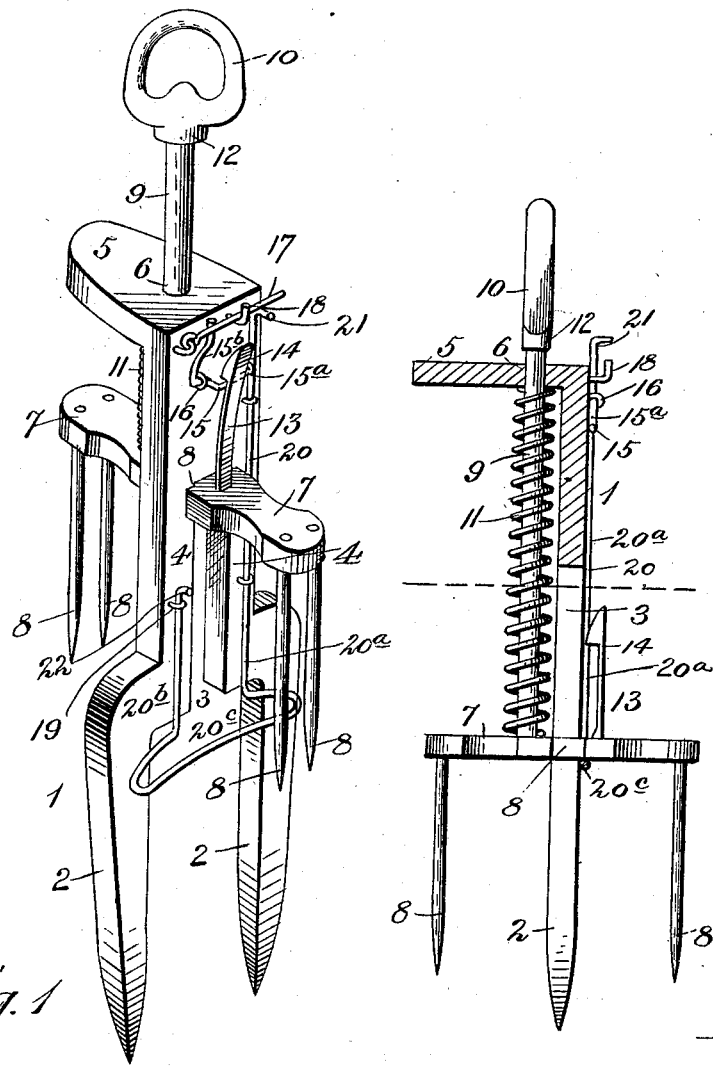
Figure 3:
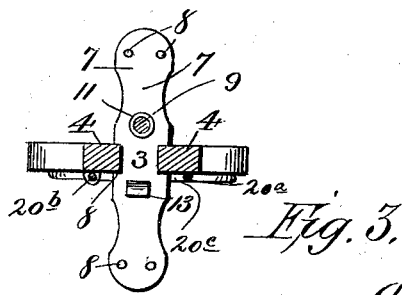

In the drawings which accompany this specification and of which they form a part, Figure 1 is a perspective of my trap set. Fig. 2 is a longitudinal section of my trap sprung. Fig. 3 is a transverse section of the same.

Like numerals of reference designate like parts wherever they occur in the drawings.

My device consists of three principal parts—the frame, the impaling mechanism, and the trigger mechanism. Each will be taken up and described in the order named.

The numeral 1 designates the frame, which has formed integral therewith tines 2 of a fork designed to be planted astride of the mole-run. This frame 1 is bifurcated or slotted at 3 to provide guides 4 for the impaling mechanism. A handpiece or guide member 5 is secured to the top of the frame or formed integral therewith and is perforated at 6 to accommodate the sliding rod of the impaling mechanism. The piece 5 forms a convenient handhold in the operation of setting my trap.

The impaling mechanism consists of a cross-head 7, notched at 8 and mounted to slide in the guides 4, the diverging impaling-pins 8, fitted in the cross-head, the reciprocating rod 9, inserted in the cross-head and provided with a handle 10, and the spring 11, surrounding the rod 9 and bearing against the cross-head at one end and the handpiece at the other. The cross-head 7 is operated by the combination of the rod 9, the handle 10, and the spring 11. The handle 10 is squared at 12 to form shoulders which serve to limit the downward movement of the cross-head.

Mounted in the cross-head 7 is a spring-tongue 13, having a beveled notch 14 therein and a beveled head. This tongue and notch form a part of the trigger mechanism and coact with a catch 15, pivotally secured to the frame 1 at 16. This catch 15 is essentially a bell-crank lever and comprises a yoke member $15^a$ and an arm $15^b$. A latch member consisting of a rounded bar 17 is pivotally secured to the frame and is adapted to be engaged by a hook 18, attached to the frame. Mounted to slide in guide-eyes 19 is a trigger 20. This trigger is a yoke-shaped member with unequal side members $20^a$ and $20^b$. The horizontal portion $20^c$ forms the foot of the trigger. The longer side member $20^a$ is bent at right angles at 21, forming a square shoulder adapted to abut and disengage the latch-bar 17 from the hook 18 when the foot $20^c$ is raised. The shorter arm $20^b$ is bent over, forming a hook 22, adapted to engage the guide-eye 19 and limit the downward movement of the trigger.

In setting my trap it is grasped by the handle 10 and the handpiece 5. The tines 2 are then planted astride the mole-run and forced into the ground. The roof of the run is either partially removed and the foot $20^c$ of the trigger inserted in the passage to a point near the bottom or the roof depressed and the foot placed in contact with the surface. The cross-head is now raised by means of the handle 10, the member $15^a$ of the catch engaged in the notch 14 of the tongue, and the arm $15^b$ grasped and held against the frame. The latch-bar 17 is now folded over and engaged in the hook 18, thereby securing the arm $15^b$ and setting the trap. The trigger 20 is now raised up with the shoulder 21 abutting the bar 17. The trap is now ready. The spring-tongue, however, enables the trap to be set in a safer manner. The catch 15 can first be secured and the cross-head then raised until the beveled head of the spring-tongue 13 contacts with said catch, the head sprung out, and the notch 14 thereby permitted to engage the catch 15. When a mole attempts to force its way through the passage beneath the trigger, it will raise the trigger, spring the trap, and be impaled by the pins 8. It will be obvious that my trap will be operated equally well from either direction.

Having described my invention, what I claim as new, and wish to secure by Letters Patent, is—

1. In combination with a cross-head bearing impaling-pins and mounted to move in guides in a frame, of the notched tongue mounted on said cross-head, the catch pivotally mounted on said frame and consisting of a bell-crank lever one arm of which is adapted to engage the notch in said tongue, the pivoted latch-bar adapted to be folded over to engage and hold the other arm of said bell-crank lever, the hook adapted to engage said latch-bar, and the trigger mounted in guides and adapted to disengage said latch-bar from said hook, by being raised.

2. In a trap, the combination, substantially as described, of a cross-head mounted to slide, a notched spring-tongue having a beveled head mounted on said cross-head, and a catch located to be engaged by said tongue, and means for setting and releasing said catch.

In testimony whereof I have hereunto set my hand in presence of two subscribing witnesses.

AMOS BENTON SIMMONS.

Witnesses:
 B. TUCKER,
 C. M. HOOVER.